(12) United States Patent
Weiler

(10) Patent No.: US 6,798,163 B2
(45) Date of Patent: Sep. 28, 2004

(54) WIPER SYSTEM FOR MOTOR VEHICLES

(75) Inventor: Michael Weiler, Karlsruhe (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/030,335

(22) PCT Filed: Mar. 9, 2001

(86) PCT No.: PCT/DE01/00881
§ 371 (c)(1),
(2), (4) Date: Apr. 17, 2002

(87) PCT Pub. No.: WO01/68421
PCT Pub. Date: Sep. 20, 2001

(65) Prior Publication Data
US 2002/0167288 A1 Nov. 14, 2002

(30) Foreign Application Priority Data
Mar. 17, 2000 (DE) .......................................... 100 13 256

(51) Int. Cl.⁷ .............................. G05B 5/00; H02H 7/08
(52) U.S. Cl. ................................ 318/445; 318/DIG. 2; 15/250.16
(58) Field of Search ................................ 318/443–445, 318/483, DIG. 2; 15/250.16, 250.17

(56) References Cited

U.S. PATENT DOCUMENTS

| | | | | |
|---|---|---|---|---|
| 3,633,238 A | * | 1/1972 | Parker | 15/250.21 |
| 3,644,956 A | * | 2/1972 | Parker | 15/250.16 |
| 5,654,616 A | * | 8/1997 | Suriano et al. | 318/443 |
| 6,163,921 A | * | 12/2000 | Takayama et al. | 15/250.29 |
| 2003/0213087 A1 | * | 11/2003 | Moein et al. | 15/250.3 |

FOREIGN PATENT DOCUMENTS

| | | |
|---|---|---|
| DE | 44 05 926 A | 8/1995 |
| DE | 197 38 232 A | 3/1999 |
| FR | 2 708 543 A | 2/1995 |
| FR | 2 710 600 A | 4/1995 |

* cited by examiner

Primary Examiner—Marlon Fletcher
(74) Attorney, Agent, or Firm—Michael J. Striker

(57) ABSTRACT

The invention is based on a wiper system (10) for motor vehicles, in which at least one wiper (36) with a wiper blade (38) of a windshield wiper (12, 14) is placed in a parked position (26) parallel to a lateral boundary (40, 46) of a vehicle window (16).

It is provided that the wiper arm (36) with the wiper blade (38) in the parked position (26) is disposed between the vehicle window (16) and a cover trim (34, 48) extending at a spacing distance (56) from the window.

7 Claims, 2 Drawing Sheets

WIPER SYSTEM FOR MOTOR VEHICLES

BACKGROUND OF THE INVENTION

The invention is based on a wiper system for motor vehicles.

The invention is based on a wiper system for motor vehicles as generically defined by the preamble to claim 1.

A windshield wiper of a motor vehicle, during one wiping motion, sweeps over a wiping region on a vehicle window that is bounded by its two turning positions. If the windshield wiper is turned off, it moves into a parked position, which can be the same as one turning position. As a rule, the parked position is located at the lowermost point to the engine hood, so that the windshield wiper rests in a so-called hood gap between the engine hood and the windshield. Not until wiping begins does it become visible and move from the parked position upward as far as the upper turning position, from which it then returns to the lower turning position or to the parked position.

If this principle is employed in synchronized wiper systems, then while the driver's view is not hindered by the parked windshield wiper, nevertheless the relatively wide hood gaps cause air turbulence, with an unfavorable aerodynamic effect and attendant noise. In contrary-motion wiper systems, moreover, because of their geometry and the swept field to be described, the two windshield wipers often cannot be internested extensively enough in one another in the parked position, so that as a rule they protrude out of the hood gaps and are therefore visible to the driver. If the windshield wipers fail to reach the parked position where they are protected from the wind, the relative wind flows around them, causing increased wind noise.

From German Patent Disclosure DE 44 05 926 A1, a wiper system of this generic type is known in which at least one windshield wiper is placed in the parked position parallel to a lateral boundary of the windshield, the boundary being the so-called A-column. The windshield wiper has a movable wiper arm, which comprises a profile that is open toward the windshield and which partly covers a wiper blade. In the parked position, the wiper arm rests laterally in a niche in the A-column of the vehicle body, and its outer contour is virtually flush with the contour of the boundary column. The wiper blade secured to the wiper arm does not reach as far as the boundary column, however, so that there is an interstice which has an unfavorable effect on the air resistance of the vehicle. Furthermore, the windshield wiper, parked without being covered, causes noise because of the open profile of the wiper blade and because of the gap between the wiper blade and the column.

SUMMARY OF THE INVENTION

According to the invention, the wiper arm with the wiper blade in the parked position is disposed between the vehicle window and a cover trim extending spaced apart from it. The cover trim is mounted on a so-called A-column of the vehicle body that at the same time forms a lateral boundary of the windshield. If the parked windshield wiper is below the cover trim, the latter being adapted to the contour of the vehicle body, then on the one hand both air resistance and noise during travel are less, and on the other, the appearance of the vehicle is improved. At the same time, the hood gaps between the engine hood and the windshield can be made narrow, so that once again both aerodynamics and the appearance of the vehicle are improved. A low weight of the cover trim, especially if it is formed by a plastic trim.

Toward the passenger compartment, the windshield wiper is covered by a black coloring on the periphery of the windshield, so that from that position, it cannot be seen by the driver, which again improves the visual appearance.

According to the invention, the wiper blade in the parked position largely closes off the opening between the cover trim and the windshield, so that only in the region between the cover trim and the side of the wiper blade remote from the windshield does a narrow gap remain open. To close this gap, one embodiment of the invention has an additional seal in this region; in the parked position of the windshield wiper, this seal is approximately flush with the cover trim. Such a tight unit between the windshield, windshield wiper and cover trim not only reduces the air resistance but also affords protection from environmental factors; in particular, dirt particles are then deposited on the wiper strip to a far lesser extent.

In a further embodiment of the invention, the seal can be embodied such that at the same time it can take on the function of a spoiler.

In parking the windshield wiper below the cover trim, it is advantageous if the windshield wiper is embodied as flat as possible. This is attained by means of a flat bar wiper blade, of the kind known for instance from German Patent Disclosure DE 197 38 232 A1, and/or by means of a flat leaf spring wiper arm, which is equipped with a flat foldaway unit. Advantageously, these components at the same time also have a substantially lower weight than conventional U-profile wiper arms with a wiper blade and a conventional support bracket system.

The motion of the windshield wiper during the wiping motion is controlled by a reversing motor. Accordingly, from the covered parked position, the windshield wiper moves downward as far as lower turning position and then moves upward again. So that the windshield wiper will not constantly strike against the column of the vehicle body, for the wiping mode an upper turning position is provided, which is located a few degrees before the parked position. The reversing motor can advantageously move to a service position, for instance for the sake of changing the wiper blades. This position is located in the middle region, between the turning positions of the windshield wiper.

BRIEF DESCRIPTION OF THE DRAWINGS

Further advantages will become apparent from the ensuing description of the drawing. In the drawing, exemplary embodiments of the invention are shown. The drawing, description and claims include numerous characteristics in combination. One skilled in the art will expediently consider the characteristics individually as well and put them together to make useful further combinations.

Shown are.

DETAILED DESCRIPTION OF THE PREFERRED EMBODIMENTS

Figure 1:
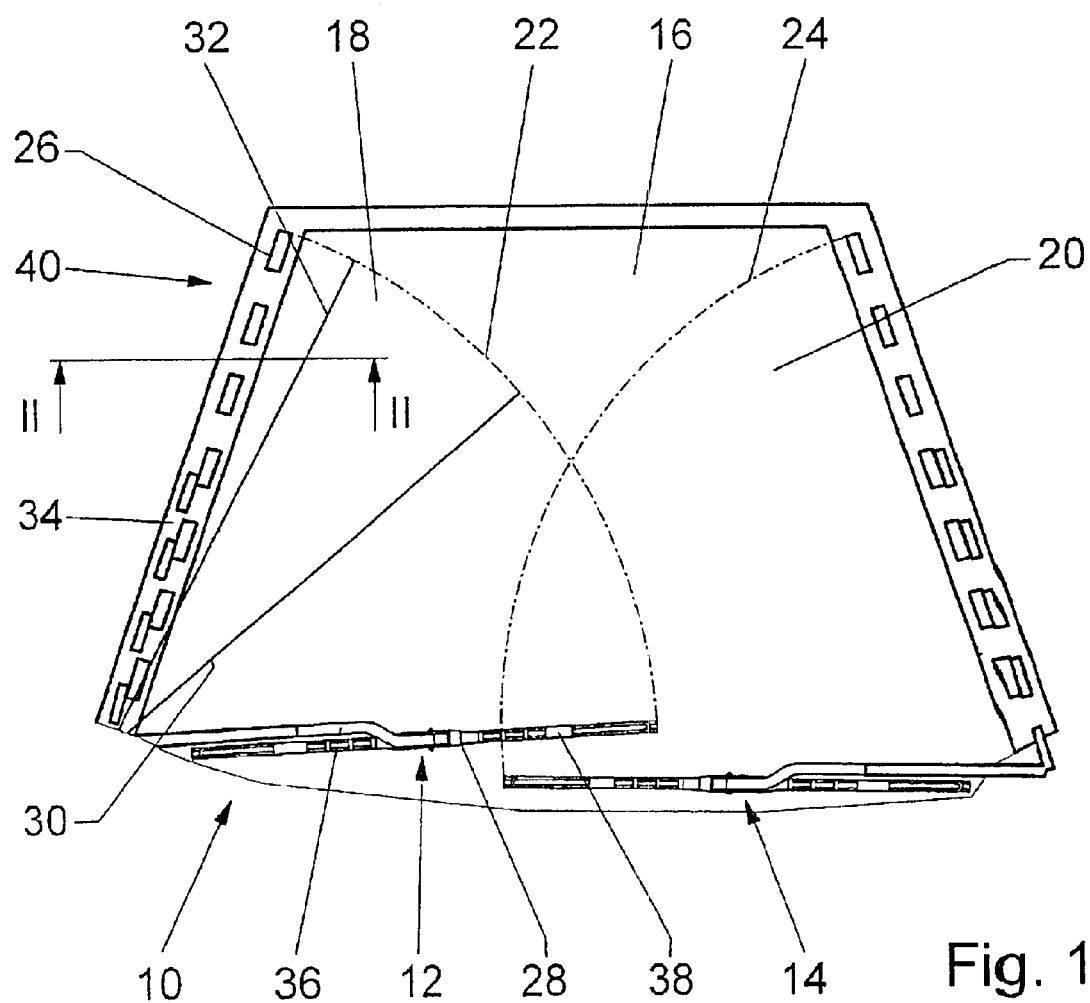
FIG. 1, a vehicle window with contrary-motion windshield wipers of a wiper system of the invention.

A wiper system 10 for motor vehicles has two windshield wipers 12 and 14, which sweep over a windshield 16 (FIG. 1). The windshield wipers 12 and 14 during the wiping mode move in contrary motion and are driven by a reversing motor, not shown here.

In the pivoting motion, the windshield wiper 12 sweeps over a swept field 18, and the windshield wiper 14 sweeps over a swept field 20 on the windshield 16, the contours of the fields being represented by the boundary lines 22 and 24. The following description pertains only to the windshield wiper 12. However, it is correspondingly valid for the windshield wiper 14 as well.

A lower turning position 28, in which the windshield wiper 12 is located, defines the swept field 18. From this position, the windshield wiper 12 moves upward to an upper turning position 32, which forms an upper boundary of the swept field 18 during the pivoting motion. A parked position 26, which the windshield wiper 12 assumes only when it is turned off, is located a few degrees after the upper turning position 32. In the parked position 26, the windshield wiper 12 is in a virtually perpendicular position and is placed parallel to a lateral boundary of the windshield 16, the boundary being a so-called A-column 40, below a cover trim 34. So that the least possible space will be occupied below the cover trim 34, the wiper arm 36 is expediently embodied as a leaf spring wiper arm, and the wiper blade 38 is expediently embodied as a flat-bar wiper blade, with a wiper strip 50. For installing or changing the wiper blade 38, the reversing motor can move to a service position 30, which is expediently located in the middle between the upper turning position 32 and the lower turning position 28, and in which repair work can easily be performed.

Figure 2:
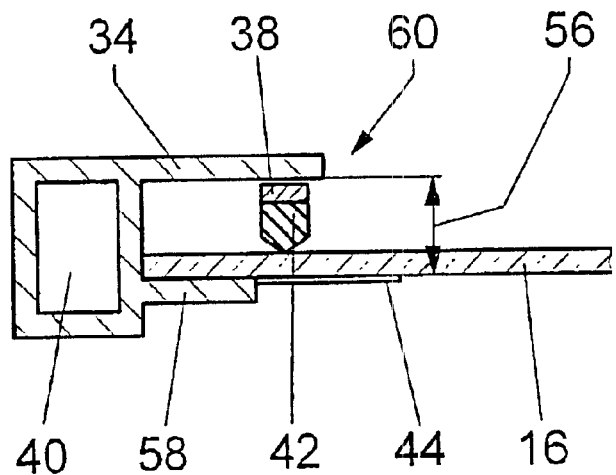
FIG. 2, an enlarged sectional view taken along the line II—II of FIG. 1.

FIG. 2 shows a fragmentary section of the windshield 16 and A-column 40. The column 40 comprises a hollow profile and has a formed-on bearing face 58 for the windshield 16. According to the invention, on the side toward the windshield 16, the column 40 has a formed-on cover trim 34, which is spaced apart from it by a distance 56. Below the cover trim 34, the windshield wiper 12 is placed in the parked position 26. A wiper strip 42 secured to the wiper blade 38 rests on the windshield 16 and closes off an opening 60 existing in this region relative to the cover trim 34.

Figure 3:
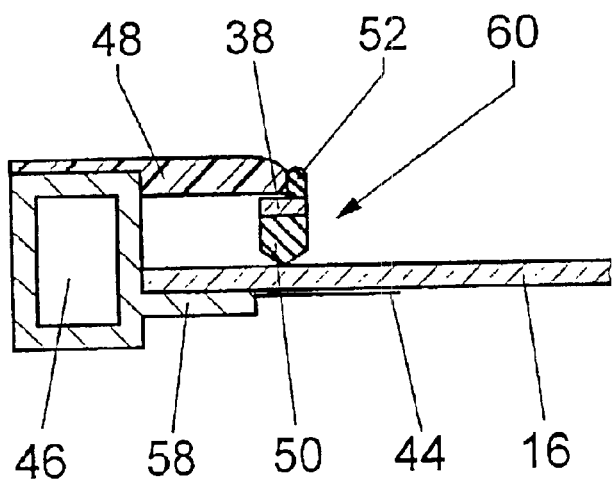
FIGS. 3–4, variants of FIG. 2.

To close off the opening 60 completely, the wiper blade 38, in one embodiment of the invention, has a seal 52 (FIGS. 3 and 4), which is expediently of rubber, on the side remote from the windshield 16. The variant of FIG. 3 shows a cover trim 48 which is at least partly embodied as a plastic trim and secured to the column 46, for instance being glued or clipped to it. To reduce the air resistance, in the region of the opening 60 the cover trim 48 has a rounded contour, which is virtually flush with the seal 52.

Figure 4:
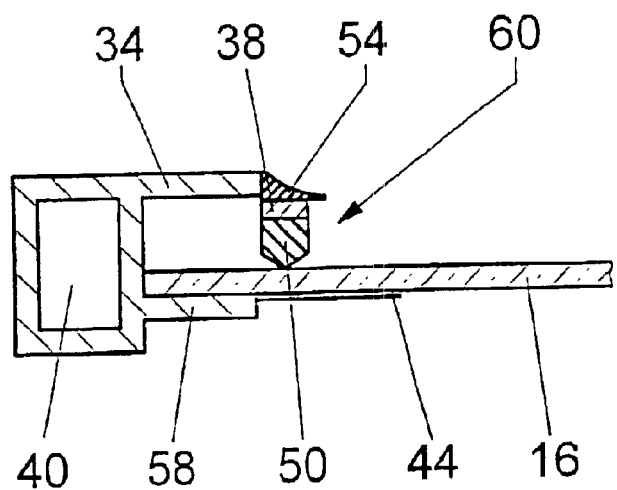

A further embodiment of the invention in FIG. 4 has a seal 54, embodied as a spoiler. The spoiler 54 increases the contact pressure of the wiper blade 38 in the wiping motion during travel. Furthermore, it forms an aerodynamically favorable join with the cover trim 34.

For reasons of appearance, in all the embodiments the windshield 16 has a black coloring 44 in the region of the cover trim 34 or 48 toward the passenger compartment. The black coloring covers the windshield wiper 12 when it is in the parked position, so that it is not visible from the interior of the vehicle.

List of Reference Numerals

10 Wiper system
12 Windshield wiper
14 Windshield wiper
16 Windshield
18 Swept field
20 Swept field
22 Boundary line
24 Boundary line
26 Parked position
28 Lower turning position
30 Service position
32 Upper turning position
34 Cover trim
36 Wiper arm
38 Wiper blade
40 A-column
42 Wiper strip
44 Black coloring
46 A-column
48 Cover trim
50 Wiper strip
52 Seal
54 Spoiler
56 Spacing distance
58 Bearing face
60 Opening

What is claimed is:

1. A wiper system (10) for motor vehicles, in which at least one wiper arm (36) with a wiper blade (38) of a windshield wiper (12, 14) is placed in a parked position (26) parallel to a lateral boundary (40, 46) of a vehicle window (16), wherein the wiper arm (36) with the wiper blade (38) in the parked position (26) is disposed between the vehicle window (16) and a cover trim (34, 48) extending at a spacing distance (56) from the window, wherein the cover trim (34) is formed onto a column (40) of the vehicle body adjoined by the vehicle window (16), wherein the wiper blade (38) in the parked position (26) largely closes off the opening (60) between the cover trim (34, 480) and the vehicle window (16), wherein the wiper blade (38), on a side remote from the vehicle window (16), has a seal (52, 54), wherein the seal, in the parked position, adjoins the cover trim (34, 48), and wherein the wiper arm (36) is embodied as a flat-bar wiper blade.

2. The wiper system (10) of claim 1, wherein the cover trim (48) is formed at least in part by a plastic trim.

3. The wiper system (10) of claim 1, wherein the wiper arm (36) with the wiper blade (38) in the parked position (26) is covered toward the passenger compartment by a black coloring (44) on the periphery of the vehicle window (16).

4. The wiper system of claim 1, wherein the seal is embodied as a spoiler (54).

5. The wiper system (10) of claim 1, wherein the wiper arm (36) is embodied as a leaf spring wiper arm.

6. The wiper system (10) of claim 1, wherein a reversing motor is provided, wherein the reversing motor reaches the upper turning position (32) of the wiper arm (36) a few degrees before the parked position (26).

7. The wiper system (10) of claim 6, wherein the reversing motor can move to a service position (30), wherein said service position is located approximately in the middle of the vehicle window (16).

* * * * *